(12) United States Patent
Jin et al.

(10) Patent No.: US 10,913,814 B2
(45) Date of Patent: Feb. 9, 2021

(54) AQUEOUS POLYURETHANE-UREA DISPERSION

(71) Applicant: Covestro Deutschland AG, Leverkusen (DE)

(72) Inventors: Chen Jin, Shanghai (CN); Winnie Wei, Shanghai (CN); Evgeny Avtomonov, Shanghai (CN); Anand Khot, Shanghai (CN); Yingdan Zhu, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 202 days.

(21) Appl. No.: 16/066,518

(22) PCT Filed: Dec. 27, 2016

(86) PCT No.: PCT/EP2016/082717
§ 371 (c)(1),
(2) Date: Jun. 27, 2018

(87) PCT Pub. No.: WO2017/114835
PCT Pub. Date: Jul. 6, 2017

(65) Prior Publication Data
US 2019/0010272 A1 Jan. 10, 2019

(30) Foreign Application Priority Data

Dec. 28, 2015 (CN) .......................... 2015 1 1035705

(51) Int. Cl.
| | | |
|---|---|---|
| C08G 18/08 | (2006.01) | |
| C08G 18/72 | (2006.01) | |
| C08G 18/73 | (2006.01) | |
| C08G 18/75 | (2006.01) | |
| C08G 18/32 | (2006.01) | |
| C08G 18/38 | (2006.01) | |
| C08G 18/42 | (2006.01) | |
| C09J 175/02 | (2006.01) | |
| C08G 18/66 | (2006.01) | |
| C08G 18/79 | (2006.01) | |
| C09J 175/06 | (2006.01) | |
| C09D 7/63 | (2018.01) | |
| C08K 5/06 | (2006.01) | |
| C09D 175/02 | (2006.01) | |

(Continued)

(52) U.S. Cl.
CPC ..... *C08G 18/0828* (2013.01); *C08G 18/0823* (2013.01); *C08G 18/3206* (2013.01); *C08G 18/3275* (2013.01); *C08G 18/3819* (2013.01); *C08G 18/3821* (2013.01); *C08G 18/3857* (2013.01); *C08G 18/4202* (2013.01); *C08G 18/4211* (2013.01); *C08G 18/4238* (2013.01); *C08G 18/664* (2013.01); *C08G 18/6651* (2013.01); *C08G 18/722* (2013.01); *C08G 18/73* (2013.01); *C08G 18/755* (2013.01); *C08G 18/797* (2013.01); *C08K 5/06* (2013.01); *C09D 7/63* (2018.01); *C09D 175/02* (2013.01); *C09D 175/12* (2013.01); *C09J 11/06* (2013.01); *C09J 175/02* (2013.01); *C09J 175/06* (2013.01); *C09J 175/12* (2013.01); *C09K 3/1021* (2013.01)

(58) Field of Classification Search
CPC ............ C08G 2170/80; C08G 18/0823; C08G 18/0828; C08G 18/12; C08G 18/3206; C08G 18/3275; C08G 18/3819; C08G 18/3821; C08G 18/3857; C08G 18/4202; C08G 18/4211; C08G 18/4238; C08G 18/664; C08G 18/722; C08G 18/73; C08G 18/755; C08G 18/797; C08K 5/06; C08L 75/06; C08L 2201/08; C08L 2201/54; C09D 7/63; C09D 175/02; C09D 175/12; C09J 11/06; C09J 175/02; C09J 175/06; C09J 175/12; C09K 3/1021
See application file for complete search history.

(56) References Cited

U.S. PATENT DOCUMENTS 3,479,310 A * 11/1969 Bayer .................... C08G 18/00
524/591
4,870,129 A   9/1989 Henning et al.
(Continued)

FOREIGN PATENT DOCUMENTS

| CN | 1265682 A | 9/2000 |
| DE | 4410557 A1 | 9/1995 |

(Continued)

OTHER PUBLICATIONS

International Search Report for PCT/EP2016/082717 dated Mar. 23, 2017.

(Continued)

*Primary Examiner* — Christopher M Rodd
(74) *Attorney, Agent, or Firm* — Faegre Drinker Biddle & Reath LLP

(57) ABSTRACT

The present invention relates to an aqueous dispersion based on polyurethane-urea, a composition comprising the same, and a use of the same in a coating agent, a sealant and an adhesive. The aqueous polyurethane-urea dispersion comprises a polyurethane-urea dispersed therein having sulfonate and/or carboxylate groups and lateral carboxyl groups, wherein the amount of said sulfonate and or carboxylate groups is 1.5 to 15 mmol/100 g; said lateral carboxyl is introduced by an aminocarboxylic acid having an amino functionality of greater than 1; the amount of said lateral carboxyl is 1.5 to 9.5 mmol/100 g, based on the polyurethane-urea solid components. Compared with the prior art, the composition of the polyurethane-urea based aqueous dispersion and a carboxyl reactive cross-linking agent provided by the present invention has a good cross-linking property and an excellent heat-resistance, which is not prone to come unglued when being exposed to heat.

8 Claims, No Drawings

(51) Int. Cl.
*C09D 175/12* (2006.01)
*C09J 11/06* (2006.01)
*C09J 175/12* (2006.01)
*C09K 3/10* (2006.01)

(56) References Cited

U.S. PATENT DOCUMENTS

| | | | |
|---|---|---|---|
| 5,834,555 | A | 11/1998 | Meisenburg et al. |
| 6,599,975 | B1 | 7/2003 | Licht et al. |
| 6,730,807 | B1 | 5/2004 | Häberle et al. |
| 8,362,142 | B2 | 1/2013 | Stollmaier et al. |
| 9,051,410 | B2 | 6/2015 | Heckroth et al. |
| 2004/0204559 | A1* | 10/2004 | Melchiors .......... C08G 18/0823 528/44 |
| 2004/0217337 | A1* | 11/2004 | Andrews ................ D06N 3/144 252/582 |
| 2004/0242765 | A1* | 12/2004 | Munzmay .......... C08G 18/0828 524/589 |
| 2007/0254974 | A1 | 11/2007 | Mager et al. |
| 2011/0244228 | A1 | 10/2011 | Blum et al. |

FOREIGN PATENT DOCUMENTS

| | | |
|---|---|---|
| DE | 19954500 A1 | 5/2001 |
| EP | 0003521 B1 | 8/1979 |
| EP | 792908 A1 | 9/1997 |
| GB | 1231040 A | 5/1971 |
| JP | 2012532968 A | 12/2012 |
| TW | 200936624 A | 9/2009 |

OTHER PUBLICATIONS

Written Opinion of the International Searching Authority for PCT/EP2016/082717 dated Mar. 23, 2017.

* cited by examiner

AQUEOUS POLYURETHANE-UREA DISPERSION

CROSS-REFERENCE TO RELATED APPLICATIONS

This application is a national stage application (under 35 U.S.C. § 371) of PCT/EP2016/082717, filed Dec. 27, 2016, which claims benefit of Chinese Application No. 201511035705.8, filed Dec. 28, 2015, both of which are incorporated herein by reference in their entirety.

TECHNICAL FIELD

The present invention relates to a polyurethane-urea based aqueous dispersion, a composition comprising the same, and a use of the same in a coating agent, a sealant and an adhesive.

BACKGROUND TECHNOLOGY

Cross-linkable aqueous polyurethane-urea dispersions used for coating agent, sealant and adhesive applications are already known. When such a dispersion is used for, for example, an adhesive (for binding a substrate), it is often processed according to the thermal activation method. The dispersion is applied to the substrate, and after the completely evaporation of water, an adhesive layer is activated by heating (for example, using an infrared heater) to convert it into a viscous state. The heat-resistance of an adhesive will affect its adhesive effect in the case of storage, transportation and high-temperature conditions. If the heat-resistance of the adhesive is poor, the joint part at which the materials are bound is prone to come unglued.

In order to improve the adhesion property, a hydroxyl-functional aqueous polyurethane-urea dispersion may be combined with an isocyanate-functional cross-linking agent to achieve the adhesion property, for example, as described in U.S. Pat. No. 4,870,129A. The disadvantage of this method is that the hydroxyl-functional polyurethane-urea dispersion is a two-component system, thus the reaction of the isocyanate in this system with water will shorten the operable time of the adhesive, usually only a few hours.

It is also possible to combine a carboxylate-functional polyurethane-urea dispersion with an isocyanate-functional cross-linking agent to achieve the adhesion property. For example, US2007/0254974 employs monosodium N-(2-aminoethyl)-β-alaninate to introduce carboxylate into the polyurethane-urea. The polyurethane-urea obtained by such a method has a large particle size, and the polyurethane-urea has a poor cross-linkable property with the carbodiimides cross-linking agent, and thus having a poor adhesion property.

DE19954500A, DE4410557A or EP792908A uses a dimethylol propionic acid to introduce carboxylate into the polyurethane-urea. However, the dimethylol propionic acid is in a solid form, which is not conducive to the preparation of polyurethane-urea. The adhesive obtained thereby has a poor heat-resistance, and is prone to come unglued after heating, thus is not sufficient to meet the requirement for being used in or being used as an adhesive.

US2011/0244228 discloses a polyurethane or polyurethane-urea dispersion comprising terminal carboxyl groups. The amount of the terminal carboxyl groups of the dispersion will limit the molecular weight of the dispersion, degrading the performances of the dispersion as an adhesive, and requiring more carbodiimide-functional cross-linking agents to assist in achieving the performance requirements, thus resulting in a rise of the cost.

EP0003521B1 discloses an aqueous dispersion of polyisocyanate-polyaddition products. Said polyaddition products carry from 0.01 to 200 mmol per 100 g of sulphonate groups and from 0.01 to 200 mmol per 100 g of carboxyl groups, based on the solid components of the polyisocyanate-polyaddition products. The aqueous dispersion of said polyisocyanate-polyaddition products comprises a high content of carboxyl and sulfonate groups.

CN98807680.2 discloses a latently cross-linked aqueous polyurethane dispersion, comprising a polyurethane, having hydrophilic groups which can make it dispersed in water and carbodiimide groups, but is substantially free of carboxyl groups; or a physical mixture, comprising a polyurethane having hydrophilic groups, a carbodiimide and a polymer dispersed phase; the polyurethane is substantially free of carbodiimide groups or carboxyl groups; the carbodiimide is substantially free of hydrophilic groups which can make it dispersed in water; and the polymer dispersed phase has carboxyl groups but is substantially free of carbodiimide groups. The aqueous polyurethane dispersion contains a high content of carboxyl and sulfonate groups.

SUMMARY OF THE INVENTION

The term "aqueous polyurethane-urea dispersion" may also be used as a synonym of aqueous polyurethane dispersion and/or aqueous polyurethane polyurea dispersion and/or aqueous polyurea dispersion.

The term "sulfonate" as used herein is represented by $-SO_3^-$.

The term "carboxylate" as used herein is represented by $-COO^-$.

The amount of the terms sulfonate and/or carboxylate groups is the mmol value of the sulfonate and/or carboxylate groups comprised in per 100 g of the polyurethane-urea solid components. The mmol value of the sulfonate and/or carboxylate groups is the mmol value of the compound components comprising the sulfonate and/or carboxylate groups*the number of the sulfonate and/or carboxylate groups comprised in per mole of compound components.

The amount of the term lateral carboxyl groups is the mmol value of the lateral carboxyl groups comprised in per 100 g of the polyurethane-urea solid components. The mmol value of the lateral carboxyl groups is the mmol value of the carboxyl-containing compounds having an amino functionality of greater than 1*the number of the lateral carboxyl groups comprised in per mole of the carboxyl-containing compounds.

The amount of the term terminal carboxyl groups is the mmol value of the terminal carboxyl groups comprised in per 100 g of the polyurethane-urea solid components.

The term aminocarboxylic acid is a compound containing carboxyl group(s) and amino group(s) capable of reacting with an isocyanate, and the molecular weight thereof is less than 5000.

The composition of the aqueous polyurethane-urea dispersion of the present invention and a carboxyl reactive cross-linking agent has a very good cross-linking property, and the composition of the aqueous polyurethane-urea dispersion of the present invention and, for example, carbodiimides compound has an excellent heat-resistance, which is not prone to come unglued when being exposed to heat, and is available for the preparation of adhesives.

The present invention provides an aqueous polyurethane-urea dispersion comprising a polyurethane-urea dispersed therein having sulfonate and/or carboxylate groups and lateral carboxyl groups; the amount of said sulfonate and/or carboxylate groups is 1.5-15 mmol/100 g; said lateral carboxyl groups are introduced by an aminocarboxylic acid having an amino functionality of greater than 1; the amount of said lateral carboxyl groups is 1.5-9.5 mmol/100 g, based on the polyurethane-urea solid components.

The polyurethane-urea in said aqueous polyurethane-urea dispersion is prepared by comprising the following components:
A) at least one polyol component having a number-average molecular weight of 400-5000 Daltons and a hydroxyl functionality of not less than 1.9;
B) optionally at least one polyol component having a number-average molecular weight of 62-399 Daltons,
C) at least one diisocyanate or polyisocyanate component,
D) at least one aminocarboxylic acid having an amino functionality of greater than 1, and;
E) at least one amino compound having sulfonate and/or carboxylate groups.

The amino functionality of said aminocarboxylic acid is 2-4, preferably 2-3, and more preferably 2.

Said aminocarboxylic acid is selected from one or more of a group consisting of L-lysine, L-tryptophan, L-arginine, L-serine, D-lysine, D-serine, D-tryptophan, D-arginine, L-histidine, D-histidine, DL-tryptophan, DL-serine, DL-lysine, D-cysteine or L-lysine-L-glutamate salt or the like.

Said aminocarboxylic acid is preferably lysine, and more preferably L-lysine.

The amount of said sulfonate and/or carboxylate groups is 3.2-10 mmol/100 g, and preferably 3.2-4.8 mmol/100 g, based on the polyurethane-urea solid components.

The amount of said sulfonate and/or carboxylate groups may be 5.2-7.8 mmol/100 g, based on the polyurethane-urea solid components.

The amount of said lateral carboxyl groups is 1.5-7 mmol/100 g, and preferably 1.5-5 mmol/100 g, based on the polyurethane-urea solid components.

The pH value of said aqueous polyurethane-urea dispersion is 6-9.

Said aqueous polyurethane-urea dispersion is a one-component or two-component aqueous dispersion.

Said aqueous polyurethane-urea dispersion is a one-component aqueous dispersion.

The solid content of said aqueous polyurethane-urea dispersion is 10-70%, preferably 35-60%, and more preferably 45-55%.

In the preparation process of the polyurethane-urea in said aqueous polyurethane-urea dispersion, component A) is usually used in an amount of 50-96 parts by weight, and preferably 75-95 parts by weight; component B) is usually used in an amount of 0-10 parts by weight, and preferably 0-5 parts by weight; component C) is usually used in an amount of 3-40 parts by weight, and preferably 5-20 parts by weight; the components A), B) and C) are all relative to the polyurethane-urea solid components.

Components A) to C) and the aforesaid typical and preferred amounts thereof also include all combinations of the range of the number that are mentioned individually.

Said component A) preferably has a polyol having 1.9-4 hydroxyl groups, and more preferably a polyol having 1.9-3 hydroxyl groups.

More preferably, said component A) is a polyether polyol, a polyester polyol, a polycarbonate polyol, a polylactone polyol, a polyimide polyol, or a combination thereof.

Further preferably, said component A) is a polyester polyol, a polycarbonate polyol, or a combination thereof.

Most preferably, the component A) is a polyester polyol.

Said polyester polyol is a linear polyester diol or a lightly branched polyester polyol, and is prepared by comprising the following components: aliphatic, alicyclic or aromatic di- or poly-carboxylic acids, such as succinic acid, methyl succinic acid, glutaric acid, adipic acid, pimelic acid, suberic acid, azelaic acid, sebacic acid, nonane dicarboxylic acid, decane dicarboxylic acid, terephthalic acid, isophthalic acid, phthalic acid, tetrahydrophthalic acid, hexahydrophthalic acid, cyclohexane dicarboxylic acid, maleic acid, fumaric acid, malonic acid or trimellitic acid; anhydrides, such as phthalic anhydride, trimellitic anhydride or succinic anhydride, or mixtures thereof; low molecular weight polyols, such as ethylene glycol, di-, tri- or tetra-ethylene glycol, 1,2-propylene glycol, di-, tri- or tetra-propylene glycol, 1,3-propylene glycol, 1,4-butanediol, 1,3-butanediol, 2,3-butanediol, 1,5-pentanediol, 1,6-hexanediol, 2,2-dimethyl-1,3-propanediol, 1,4-dihydroxyl-cyclohexane, 1,4-dihydroxyl methylcyclohexane, 1,8-octanediol, 1,10-decanediol, 1,12-dodecanediol, or mixtures thereof; optionally using polyols with higher functionality, such as trimethylolpropane, glycerol or pentaerythritol, alicyclic and/or aromatic di- and poly-hydroxyl compounds.

Said polyester polyols may also be lactones homopolymers or mixed polymers, preferably obtained by the addition of a lactone or a lactone mixture, such as butyrolactone, ε-caprolactone and/or methyl-ε-caprolactone to a suitable initiator molecule having di- and/or higher functionality (such as the aforementioned low molecular weight polyols used as the chain-extending components of polyester polyols). Said ε-caprolactone is preferably a polymer of ε-caprolactone.

Said polyester polyols may also be linear polyester diols prepared by one or more of a group consisting of adipic acid, 1,4-butanediol, 1,6-hexanediol or 2,2-dimethyl-1,3-propanediol as chain-extending components.

Said polycarbonate polyol is a polycarbonate polyol having a hydroxyl group, for example, can be prepared by reacting a glycol with diaryl carbonate and/or dialkyl carbonate and phosgene. Said glycol is selected from 1,4-butanediol and/or 1,6-hexanediol; said diaryl carbonate is selected from diphenyl carbonate; said dialkyl carbonate is selected from dimethyl carbonate.

Said polycarbonate polyol is preferably a polycarbonate polyol prepared by the reaction of 1,6-hexanediol with dimethyl carbonate.

Said polyether polyol is selected from one or more of a group consisting of styrene oxide, ethylene oxide, propylene oxide, tetrahydrofuran, butylene oxide, polymerization products of epichlorohydrin and a mixed addition and grafted products thereof, condensation products of polyols or the mixtures thereof, or alkoxylated products of polyols, amines and amino alcohols.

Said polyether polyol is preferably selected from one or more of a group consisting of a homopolymer, a mixed polymer or a grafted polymer of propylene oxide and ethylene oxide. These polymers can be obtained by the addition of said epoxide to the low molecular weight diol or triol (the aforementioned low molecular weight polyol in the preparation of a polyester polyol) or to the low molecular weight polyols having a higher functionality (such as pentaerythritol or sugar), or to the water.

Said component B) is selected from one or more of a group consisting of n-butanol, isobutanol, 2-butoxydiethyl ether, 3-methylolpropane, glycerol, polyether polyol, polyester polyol, polycarbonate polyol, polylactone polyol or polyamide polyol. Component B) may also be a polyhydroxyl, especially dihydroxyl alcohol used in the preparation of a polyester polyol as mentioned in component A), and a low molecular weight polyester diols, e.g., bis-(hydroxyethyl) adipate, or short chain addition products or mixed addition products of ethylene oxide or propylene oxide starting from an aromatic diol. The aromatic diol is selected from 1,4-, 1,3-, 1,2-dihydroxybenzene or 2,2-bis-(4-hydroxyphenyl)-propane (bisphenol A).

The diisocyanate or polyisocyanate component of said component C) is preferably diisocyanate $Y(NCO)_2$, wherein Y represents a divalent aliphatic hydrocarbyl group having 4 to 12 carbon atoms, a divalent alicyclic hydrocarbyl group having 6 to 15 carbon atoms, a divalent aromatic hydrocarbyl group having 6 to 15 carbon atoms, a divalent araliphatic hydrocarbyl group having 7 to 15 carbon atoms, or a combination thereof.

Said diisocyanate $Y(NCO)_2$ is selected from a group consisting of tetramethylene diisocyanate, methyl pentamethylene diisocyanate, hexamethylene diisocyanate, dodecane diisocyanate, 1,4-diisocyanato-cyclohexane, 1-isocyanato-3,3,5-trimethyl-5-isocyanatomethyl-cyclohexane, 4,4'-diisocyanato-dicyclohexyl-methane, 4,4'-diisocyanato-2,2-dicyclohexylpropane, 1,4-diisocyanatobenzene, 2,4-diisocyanatotoluene, 2,6-diisocyanatotoluene, 4,4'-diisocyanato-diphenyl methane, 2,2'- and 2,4'-diisocyanato-diphenyl methane, tetramethylxylylene diisocyanate, p-xylylene diisocyanate, p-isopropylidene diisocyanate, p-phenylene diisocyanate, cyclohexane dimethylene diisocyanate, or a combination thereof.

Said diisocyanate $Y(NCO)_2$ is preferably an aliphatic or araliphatic diisocyanate, such as hexamethylene diisocyanate, 1,4-diisocyanato-cyclohexane, 1-isocyanato-3,3,5-trimethyl-5-isocyanatomethyl-cyclohexane, 4,4'-diisocyanato-dicyclohexyl-methane, 4,4'-diisocyanato-2,2-dicyclohexyl propane, or a combination thereof.

Said diisocyanate $Y(NCO)_2$ is more preferably a mixture of hexamethylene diisocyanate and 1-isocyanato-3,3,5-trimethyl-5-isocyanatomethyl-cyclohexane.

Polyisocyanates known per se having higher functionalities or modified polyisocyanates known per se in the field of polyurethane chemistry, such as polyisocyanates containing carbodiimide groups, allophanate groups, isocyanurate groups, urethane groups and/or biuret groups can also be used as said diisocyanate or polyisocyanate component, according to the proportion.

The amino functionality of aminocarboxylic acid in said component D) is 2-4, preferably 2-3, and more preferably 2.

Said aminocarboxylic acid is selected from one or more of a group consisting of L-lysine, L-tryptophan, L-arginine, L-serine, D-lysine, D-serine, D-tryptophan, D-arginine, L-histidine, D-histidine, DL-tryptophan, DL-serine, DL-lysine, D-cysteine or L-lysine-L-glutamate salt or the like.

The amino acid is preferably lysine, and more preferably L-lysine.

The amino compound of said component E) is selected from a group consisting of N-(2-aminoethyl)-2-amino-ethanesulfonic acid, N-(3-aminopropyl)-2-amino-ethanesulfonic acid, N-(3-aminopropyl)-3-amino-propanesulfonic acid, N-(2-aminoethyl)-3-amino-propanesulfonic acid, sodium, lithium, potassium, tertiary amine salts of similar carboxylic acids, reaction products of 1 mol of diamine, such as 1,2-ethane diamine or isophoronediamine, with 2 mol of acrylic acid or maleic acid according to the Michael addition, N-methyl ethanolamine, diethanolamine, diisopropanolamine, ethanolamine, diethylamine, 2-propanol amine, 1,2-ethylenediamine, 1,6-hexamethylenediamine, 1-amino-3,3,5-trimethyl-5-aminomethyl-cyclohexane (isophoronediamine), piperazine, 1,4-diaminocyclohexane, bis-(4-aminocyclohexyl)-methane, adipic dihydrazide, hydrazine or hydrazine hydrate, polyamines such as diethylene triamine, 1,3-diamino-2-propanol, N-(2-hydroxyethyl)-ethylenediamine, N,N-bis(2-hydroxyethyl)-ethylenediamine or a combination thereof.

The present invention further provides a method for preparing an aqueous polyurethane-urea dispersion according to the present invention, characterized by, in the first step, adding some or all of component A), optional component B), component C), optionally in the presence of a solvent which is miscible with water but is inert to an isocyanate group, into the reactor and heating it to 50-120° C., and then adding any one or more of component A), optional component B), or component C) that are not added in the beginning of the reaction to form a prepolymer; in the second step, the prepolymer is chain-extended with a mixture of D) and E) at 15-60° C., and converting it into an aqueous phase before, during or after the chain extension of the prepolymer and removing the solvent that is optionally used; in the third step, when the polyaddition reaction has been partially or completely carried out, dispersing, emulsifying or dissolving steps are carried out then. The dispersion of polyurethane-urea may be conducted in a homogeneous phase by one or more steps, or may be partially carried out in the dispersed phase in the case of multi-step reaction. After the third step, it is optional to further carry out the polyaddition or modification in the dispersed phase. All methods known in the prior art can be used in said preparation.

The solvent is selected from a group consisting of acetone, butanone, tetrahydrofuran, dioxane, acetonitrile, dipropylene glycol dimethyl ether and 1-methyl-2-pyrrolidone; preferably butanone or acetone, and particularly preferably acetone. The solvent may be added only at the beginning of the preparation, and may also be added in the later section. The reaction pressure may be an atmospheric or superatmospheric pressure.

The amounts of components A) to C) are adjusted such that the isocyanate value of the prepolymer is 1.05 to 2.5, and preferably 1.1 to 1.5. The isocyanate content of the prepolymer is 0.3-3.0%, preferably 0.7-1.5%, and particularly preferably 0.9-1.5%.

Based on the total amount of isocyanate-reactive groups, the reaction of component A) and optional component B) with component C) is partially or completely carried out, but preferably completely carried out. The reaction degree is often monitored according to the isocyanate group content of the reaction mixture. For this purpose, two spectrometric determinations such as infrared or near-infrared spectroscopy, determination of the refractive index, as well as chemical analysis, such as the titration of the taken samples, can all be carried out.

In order to promote the isocyanate addition reaction, it is possible to use common catalysts that are already known to a person skilled in the art to promote said reaction. The catalyst is selected from a group consisting of triethylamine, 1,4-diazabicyclo-[2,2,2]-octane, dibutyltin oxide, tin dioctoate or dibutyltin dilaurate, bis-(2-ethyl hexanoate) tin or other organometallic compounds.

The chain-extension of the prepolymer can be carried out before, during or after the dispersion. The chain-extension is preferably carried out before the dispersion. The chain-extension is carried out at a temperature of 15 to 60° C., preferably 25 to 55° C., and more preferably 40 to 50° C.

Component D) and E) can be added into the reaction mixture in a diluted form using an organic solvent and/or water, and can be added in any required order or added at the same time by means of the addition of a mixture.

The prepolymer is introduced and dispersed in water, or to which water is added to disperse it using optionally a strong shear, e.g. vigorous stirring. Then, the chain-extension is carried out, if it has not been carried out yet in a homogeneous phase.

After the dispersion, the organic solvent, such as acetone, is removed by distillation.

The preparation of the polyurethane-urea as set forth in the present invention may use no external emulsifiers.

The aqueous dispersion of the present invention may be used alone or in combination with coatings and adhesives, auxiliary substances and additives known in the art of adhesives, in particular emulsifiers and light stabilizers such as UV absorbers and sterically hindered amines, as well as antioxidants, fillers and auxiliary agents, e.g., anti-settling agents, anti-foaming and/or wetting agents, flowing conditioners, reactive diluents, plasticizers, neutralizing agents, catalysts, auxiliary solvents and/or thickeners, and additives such as pigments, dyes or flatting agents.

Tackifiers can also be added into the aqueous dispersion of the present invention.

Additives may be added into the aqueous dispersion of the present invention before the processing, and at least a part of the additives can also be added before or during the dispersion of the adhesives.

The selection and the used dose of these substances that may be added to each component and/or the entire mixture in principle are known to a person ordinarily skilled in the art, and can easily be determined.

The dispersion of the present invention can also be mixed together with and used in combination with other aqueous or solvent-containing oligomers or polymers, for example, polyisocyanate, polyvinyl ester, polyvinyl ether, polyvinyl alcohol, polyethylene, polystyrene, polybutadiene, polyvinyl chloride, polyurethane-urea, polyurethane-polyacrylate, polyester, polyacrylate and/or copolymers. A preliminary test must be used in each case to test the compatibility of such a mixture.

The dispersion of the present invention can also be mixed together with and used in combination with other adhesives containing functional groups, such as carboxyl, hydroxyl and/or blocked isocyanate groups.

The present invention also provides a composition comprising the aqueous polyurethane-urea dispersion according to the present invention.

Said composition is a coating, an adhesive or a sealant.

Said composition further comprises a cross-linking agent containing carboxyl reactive groups.

Said cross-linking agent is selected from a group consisting of carbodiimides compound, aziridines compound, epoxides or a combination thereof.

Said cross-linking agent is preferably carbodiimides compound.

Said carbodiimides compound is selected from the carbodiimides compound dispersed, emulsified, dissolved in water or the carbodiimides compound that can be dispersed, emulsified and/or dissolved in water. Each molecule thereof contains on average 3 to 20 carbodiimide constitutional units, and preferably 4 to 8. It can be obtained by the carbodiimidization of diisocyanate, optionally mono-functional isocyanate and/or higher functional isocyanate, and subsequently, simultaneously or previously reacting with the hydrophilic component.

Said diisocyanate is selected from a group consisting of tetramethylene diisocyanate, methyl pentamethylene diisocyanate, hexamethylene diisocyanate, dodecane diisocyanate, 1,4-isocyanatocyclohexane, 1-isocyanato-3,3,5-trimethyl-5-isocyanatomethyl-cyclohexane, 4,4'-diisocyanato-dicyclohexylmethane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanato-diphenyl methane, 2,2'- and 2,4'-diisocyanato-diphenyl methane, tetramethyl benzene dimethyl diisocyanate, 1,4-bis(isocyanatomethyl)benzene or p-isopropyl diisocyanate; said mono-functional isocyanate is selected from a group consisting of stearyl isocyanate, phenyl isocyanate, butyl isocyanate or hexyl isocyanate; said higher functional isocyanate is selected from a group consisting of trimer of diisocyanate, isocyanate dimer, allophanate or biuret; said hydrophilic component is selected from an ethylene oxide polymer starting on an alcohol or amine or a mono- or bi-functional polyether of a ethylene oxide/propylene oxide copolymer.

Said carbodiimides compound is preferably obtained by the carbodiimidization of 1-isocyanato-3,3,5-trimethyl-5-isocyanatomethyl-cyclohexane and/or 4,4'-diisocyanato-dicyclohexylmethane.

Said carbodiimides compound may be a mixed carbodiimides compound based on different isocyanates.

Said carbodiimides compound is more preferably Carbodilite® SV-02, Carbodilite® V-02-L2, Carbodilite® E-02, Desmodur 2802 XP or a combination thereof, commercially available from Nisshinbo, Kyoto, Japan.

Said carbodiimides compound is most preferably Desmodur 2802 XP, Carbodilite® V-02-L2, or a combination thereof.

Said carbodiimides compound may be the reaction product of the following substances:

i) at least one carbodiimide based on TMXDI® (commercially available from Allnex, USA), Desmodur® W, Desmodur® I, Desmodur® H and/or Desmodur® T (commercially available from Bayer MaterialScience, Germany) having 3 to 20, and preferably 4 to 8 carbodiimide constitutional units on average, and ii) a hydrophilic component, selected from a group consisting of at least one hydroxyl functionalized polyether based on ethylene oxide or based on ethylene oxide and propylene oxide, methoxy polyethylene glycol having a molecular weight of 350 to 3000 g/mol, ethoxyl polyethylene glycol, butoxyl polyethylene glycol, Carbowax® MPEG 750, MPEG 550, MPEG 350 (commercially available from The DOW Chemical Company, USA), Polyether LB 25 (commercially available from Bayer MaterialScience, Germany), a corresponding amino-functional polyether, an ionic hydrophilic substances such as aminocarboxylic acid, hydroxycarboxylic acid, or aminosulfonic acid, e.g., a salt of dimethylolpropionic acid, dimethylolbutanoic acid, hydroxypivalic acid, aminoethanesulfonic acid, iii) optionally other hydroxyl- and/or amino-functional and/or other isocyanate-reactive compounds, such as a monohydric alcohol, selected from a group consisting of butyl glycol, butyl diglycol, ethoxy diglycol, methoxypropanol, methoxy glycol, methanol, benzyl alcohol, fatty alcohol, 2-ethylhexanol, stearyl alcohol, oleyl alcohol, ethanol, butanol, isopropanol, hexanol, cyclohexanol, octanol, pentanol and/or a monoamine, a oxime, a lactam, selected from a group consisting of diethylamine, diisopropylamine, triazole, dimethyl triazole, dimethylpyrazole, morpholine, butanone oxime, caprolactam, tert-butylbenzyl amine, dialkyl malonate, ethyl acetoacetate, cyclopentanone carboxyalkyl ester, and/or diol, diamine, amino alcohol, triol, such as trimethylolpropane, glycerol, neopentyl glycol, butylene glycol, ethylene glycol, cyclohexanediol, cyclohexanedimethanol, propylene glycol, diethylene glycol, dipropylene glycol, triethylene glycol, tripropylene glycol, ethanolamine, diethanolamine, isopropanolamine, diisopropanolamine, triethanolamine, hydroxyethyl ethylene diamine, ethylene diamine, isophorone diamine, hexamethylene diamine, or hydrazine.

Components i and iii) can react in any order, optionally in the presence of a solvent.

Said carbodiimides compound preferably contains the reaction products obtained from:

50 to 97 wt % of component i),
3 to 40 wt % of component ii), and
0 to 25 wt % of component iii).

Said carbodiimides compound more preferably contains the reaction products obtained from:

60 to 90 wt % of component i),
5 to 27 wt % of component ii), and
0.5 to 15 wt % of component iii).

Said carbodiimides compound can be prepared by known methods.

Carbodiimidization catalyst is preferably an organic phosphorus compound, and particularly preferably an organic phosphorus compound selected from a group consisting of phosphine oxide, phospholane oxide and phospholene oxide and sulfo and imino analogs thereof. Said oxides and sulfides and imino derivatives of phosphine, phospholene and phospholane in particular may be produced by corresponding precursors containing trivalent phosphorus such as phosphine, phospholane and phospholene in situ.

Said phospholene oxide is preferably selected from a group consisting of 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide.

Carbodiimidization catalyst can also be selected from a group consisting of 1-butyl-2-phospholene-1-oxide, 1-(2-ethylhexyl)-2-phospholene-1-oxide, 1-methyl-2-phospholene-1-sulfide, 1-(2-chloroethyl)-2-phospholene-1-oxide, 1-p-methylphenyl-2-phospholene-1-oxide, 1-1-chloromethyl-2-phospholene-1-oxide, 1,2-dimethyl-2-phospholene-1-oxide, 1-methyl-3-chloro-2-phospholene-1-oxide, 1-methyl-3-bromo-2-phospholene-1-oxide, 1-chlorophenyl-2-phospholene-1-oxide, 1,3,4-trimethyl-2-phospholene oxide, 1,2,4-trimethyl-2-phospholene-1-oxide, 1,2,2-trimethyl-2-phospholene-1-oxide, 1-phenyl-2-phospholene-1-sulfide and 1-phenyl-2,3-dimethyl-2-phospholene-1-oxide. The above-mentioned phospholene derivatives can be present in a pure form or in the form as an isomer mixture with 2-phospholene isomer.

Carbodiimidization catalyst can further be selected from a group consisting of diphenyl phosphinic acid and salt thereof, bis(2,4,4-trimethylamyl)-phosphinic acid, tributyl phosphine, triisobutylphosphine sulfide, trialkylphosphine oxide, such as trioctylphosphine oxide or trihexylphosphine oxide, triphenylphosphine, tetraphenylphosphine bromide, tetrabutylphosphine oxide, tetrabutylphosphine bromide, bis (2,4,4-trimethylamyl)-dithiophosphonic acid and bis(2,4,4-trimethylamyl)-monothiophosphonic acid.

Preferably, carbodiimides compound is prepared by the following method: heating at least one at least bi-functionalized isocyanate in the presence of suitable catalyst(s) at 100 to 250° C. to firstly allow the carbodiimide to react under the condition of carbon dioxide elimination until the desired conversion temperature is achieved; then making such carbodiimide react with component ii) and optionally with component iii) simultaneously or subsequently in another reaction step; then optionally dispersing, emulsifying or dissolving it.

The molar ratio of the carbodiimide group(s) in the carbodiimides compound to the lateral carboxyl group(s) of aqueous polyurethane-urea dispersion in the composition according to the present invention is 0.01 to 10, preferably 1 to 5, and more preferably 1 to 3.

The composition according to the present invention introduces a low-content of lateral carboxyl via an aminocarboxylic acid having an amino functionality of greater than 1. In the case where low-content of sulfonate and/or carboxylate groups are contained, the composition has a good adhesion effect, a stable heat resistance, and a stable storage property, and a reduction in the used amount of hydrophilic groups during the synthesis of the aqueous polyurethane-urea dispersion does not have much influence on the adhesion effect, the heat resistance and the storage property of the composition.

The present invention further provides an article comprising a substrate and a composition according to the present invention applied thereon.

Said substrate is suitable for all the substrates in the application of paints, e.g., all types of metals and alloys, timbers, timber-based materials, particle boards, medium density fiberboards, ceramics, stones, concrete, asphalt, hard fibers, glass, glass fibers, carbon fibers, carbon nanotubes, porcelains, plastics, leathers, textiles and/or various types of textile fiber coatings or paints.

Said substrate is suitable for all the substrates in the application of adhesives, e.g., paper, cardboards, timbers, textiles, metals, alloys, fabrics, fibers, artificial leathers, leathers or inorganic materials. They are also suitable for the adhesion of rubber materials, such as natural and synthetic rubbers, various plastics, such as polyurethane, polyvinyl acetate, polyvinyl chloride, especially polyvinyl chloride containing a plasticizer. Said adhesive combination is also suitable for the adhesion of thermoplastics, such as ABS (acrylic-butadiene-styrene), PC (polycarbonate) and mixtures thereof, and polyolefin plastics, optionally conducted after a suitable pretreatment.

Said composition is also suitable for the adhesion of the soles made from these materials, especially those based on rubber and polyvinyl chloride with the uppers made from leather or artificial leather. The composition of the present invention is further especially suitable for the adhesion of the substrates based on black rubber.

The coatings, adhesives or sealants of the present invention are obtained by the processing via methods known with the respect of use or processing of aqueous dispersions or aqueous emulsions or aqueous solutions in coating technology, adhesive technology or sealant technology.

The invention is particularly related to the following embodiments: According to a first embodiment, the invention is directed to an aqueous polyurethane-urea dispersion, comprising a polyurethane-urea dispersed therein having sulfonate and/or carboxylate groups and lateral carboxyl groups, wherein an amount of said sulfonate and/or carboxylate groups is 1.5 to 15 mmol/100 g; said lateral carboxyl groups are introduced by an aminocarboxylic acid having an amino functionality of greater than 1; an amount of said lateral carboxyl groups is 1.5 to 9.5 mmol/100 g, based on the polyurethane-urea solid components.

According to a second embodiment, the invention is directed to the aqueous polyurethane-urea dispersion according to embodiment 1, characterized in that said polyurethane-urea is prepared by comprising following components:

A) at least one polyol component having a number-average molecular weight of 400 to 5000 Daltons and a hydroxyl functionality of not less than 1.9;

B) optionally at least one polyol component having a number-average molecular weight of 62 to 399 Daltons;

C) at least one diisocyanate or polyisocyanate component;

D) at least one aminocarboxylic acid having an amino functionality of greater than 1; and E) at least one amino compound having sulfonate and/or carboxylate radicals.

According to a third embodiment, the invention is directed to the aqueous polyurethane-urea dispersion according to embodiment 1 or 2, characterized in that said aminocarboxylic acid has an amino functionality of 2.

According to a fourth embodiment, the invention is directed to the aqueous polyurethane-urea dispersion according to embodiment 3, characterized in that said aminocarboxylic acid is selected from lysine.

According to a fifth embodiment, the invention is directed to the aqueous polyurethane-urea dispersion according to any of the preceding embodiments, characterized in that the amount of said sulfonate and/or carboxylate groups is 3.2 to 10 mmol/100 g, based on the polyurethane-urea solid components.

According to a sixth embodiment, the invention is directed to the aqueous polyurethane-urea dispersion according to embodiment 5, characterized in that the amount of said sulfonate and/or carboxylate groups is 3.2 to 4.8 mmol/100 g, based on the polyurethane-urea solid components.

According to a seventh embodiment, the invention is directed to the aqueous polyurethane-urea dispersion according to embodiment 5, characterized in that the amount of said sulfonate and/or carboxylate groups is 5.2 to 7.8 mmol/100 g, based on the polyurethane-urea solid components.

According to an eighth embodiment, the invention is directed to the aqueous polyurethane-urea dispersion according to any of the preceding embodiments, characterized in that the amount of said lateral carboxyl group is 1.5 to 5 mmol/100 g, based on the polyurethane-urea solid components.

According to a ninth embodiment, the invention is directed to the aqueous polyurethane-urea dispersion according to any of the preceding embodiments, characterized in that said aqueous dispersion has a pH value of 6 to 9.

According to a tenth embodiment, the invention is directed to a composition comprising the aqueous polyurethane-urea dispersion according to any one of embodiments 1 to 9.

According to an eleventh embodiment, the invention is directed to the composition according to embodiment 10, characterized in that said composition is a coating, an adhesive or a sealant.

According to a twelfth embodiment, the invention is directed to the composition according to embodiment 10 or 11, characterized in that said composition further comprises a cross-linking agent containing carboxyl reactive groups.

According to a thirteenth embodiment, the invention is directed to the composition according to embodiment 12, characterized in that said cross-linking agent is selected from carbodiimides compound.

According to a fourteenth embodiment, the invention is directed to the composition according to embodiment 13, characterized in that a molar ratio between carbodiimide groups of said carbodiimides compound and the lateral carboxyl groups of the aqueous polyurethane-urea dispersion is 0.01 to 10.

According to a fifteenth embodiment, the invention is directed to composition according to embodiment 14, characterized in that the molar ratio between carbodiimide groups of said carbodiimides compound and the lateral carboxyl groups of the aqueous polyurethane-urea dispersion is 1 to 5.

According to a sixteenth embodiment, the invention is directed to an article, comprising a substrate and the composition according to any one of embodiments 10 to 15 applied thereon.

According to a seventeenth embodiment, the invention is directed to the article according to embodiment 16, characterized in that said substrate is selected from rubber, plastics, paper, cardboards, timbers, textiles, metals, alloys, fabrics, fibers, artificial leathers, leathers or inorganic materials.

EXAMPLES

Raw Materials and Reagents

Polyester I: poly-1,4-butylene adipate diol, OH value=50.

Polyester II: polyester diol formed by 1,6-hexanediol, neopentyl glycol and adipic acid, OH value=66.

Polyester III: poly-1,6-hexylene phthalate diol, OH value=56.

Desmodur®H: 1,6-hexamethylene diisocyanate, commercially available from Bayer MaterialScience AG, Germany.

Desmodur®I: isophorone diisocyanate, commercially available from Bayer MaterialScience AG, Germany.

Emulsifier FD®: fatty alcohol poly(ethylene/propylene glycol) ether, commercially available from Lanxess, Germany.

Aqueous carbodiimide dispersion: Desmodur 2802 XP, a hydrophilized non-ionic alicyclic carbodiimide having about 385 carbodiimide equivalent weight (40 wt % aqueous solution).

L-lysine: 50% L-lysine aqueous solution, commercially available from Feihe Chemical Co., Ltd, Xiamen.

Example 1

540 g of Polyester I and 51 g of Polyester II were dehydrated for 1 hour at 110° C. and 15 mbar, then 2.7 g of 1,4-butanediol was added, and the mixture was cooled while stirring. 45.4 g of Desmodur®H was added at 60° C., followed by the addition of 30 g of Desmodur®I. The mixture was stirred at 80 to 90° C. until it reaches the isocyanate content of 1.3%. The reaction mixture was dissolved in 930 g of acetone and was cooled to 50° C. A solution of 13.6 g of the sodium salt of N-(2-aminoethyl)-2-aminoethanesulfonic acid, 0.8 g of diethanolamine and 4.8 g of L-lysine in 69 g of water was added to the reaction mixture solution, and the reaction mixture solution was stirred vigorously for 30 minutes. Then 600 g of water was added to disperse the mixture, and the mixture was distilled subsequently to separate acetone, which was followed by the addition of 6 g emulsifier Emulsifier FD® to yield an aqueous polyurethane-urea dispersion, which has a solid content of 50.1 wt % and an average particle size of 198 nm in the dispersed phase (the average particle size was determined by dynamic light scattering, Malvern Zetasizer Nano ZS). The aqueous polyurethane-urea dispersion has a pH value of 6.5, an amount of lateral carboxyl of 2.4 mmol/100 g, an amount of sulfonate group of 4.8 mmol/100 g, based on the polyurethane-urea solid components.

Example 2

765 g of Polyester I and 72 g of Polyester II were dehydrated for 1 hour at 110° C. and 15 mbar, then 3.8 g of 1,4-butanediol was added, and the mixture was cooled while stirring. 64 g of Desmodur®H was added at 60° C., followed by the addition of 43 g of Desmodur®I. The mixture was stirred at 80 to 90° C. until it reaches the isocyanate content of 1.3%. The reaction mixture was dissolved in 1310 g of acetone and was cooled to 50° C. A solution of 21.2 g of the sodium salt of N-(2-aminoethyl)-2-aminoethanesulfonic acid, 2.9 g of N-(2-hydroxyethyl)ethylenediamine and 6.7 g of L-lysine in 98 g of water was added to the reaction mixture solution, and the reaction mixture solution was stirred vigorously for 30 minutes. Then 850 g of water was added to disperse the mixture, resulting in an aqueous polyurethane-urea dispersion, which has a solid content of 50.5 wt % and an average particle size of 226 nm in the dispersed phase (the average particle size was determined by dynamic light scattering, Malvern Zetasizer Nano ZS). The aqueous polyurethane-urea dispersion has a pH value of 6.8, an amount of lateral carboxyl of 2.4 mmol/100 g, an amount of sulfonate group of 5.3 mmol/100 g, based on the polyurethane-urea solid components.

Example 3

540 g of Polyester I and 51 g of Polyester II were dehydrated for 1 hour at 110° C. and 15 mbar, then 2.7 g of 1,4-butanediol was added, and the mixture was cooled while stirring. 45.4 g of Desmodur®H was added at 60° C., followed by the addition of 30 g of Desmodur®I. The mixture was stirred at 80 to 90° C. until it reaches the isocyanate content of 1.3%. The reaction mixture was dissolved in 930 g of acetone and was cooled to 50° C. A solution of 12.2 g of the sodium salt of N-(2-aminoethyl)-2-aminoethanesulfonic acid, 0.8 g of diethanolamine, 0.3 g of N-(2-hydroxyethyl)ethylenediamine and 4.8 g of L-lysine in 69 g of water was added to the reaction mixture solution, and the reaction mixture solution was stirred vigorously for 30 minutes. Then 600 g of water was added to disperse the mixture, and the mixture was distilled subsequently to separate acetone, which was followed by the addition of 6 g emulsifier Emulsifier FD® to yield an aqueous polyurethane-urea dispersion, which has a solid content of 51.5 wt % and an average particle size of 205 nm in the dispersed phase (the average particle size was determined by dynamic light scattering, Malvern Zetasizer Nano ZS). The aqueous polyurethane-urea dispersion has a pH value of 6.5, an amount of lateral carboxyl of 2.4 mmol/100 g, an amount of sulfonate group of 4.3 mmol/100 g, based on the polyurethane-urea solid components.

Example 4

540 g of Polyester I and 51 g of Polyester II were dehydrated for 1 hour at 110° C. and 15 mbar, then 2.7 g of 1,4-butanediol was added, and the mixture was cooled while stirring. 45.4 g of Desmodur®H was added at 60° C., followed by the addition of 30 g of Desmodur®I. The mixture was stirred at 80 to 90° C. until it reaches the isocyanate content of 1.3%. The reaction mixture was dissolved in 930 g of acetone and was cooled to 50° C. A solution of 10.9 g of the sodium salt of N-(2-aminoethyl)-2-aminoethanesulfonic acid, 0.8 g of diethanolamine, 0.7 g of N-(2-hydroxyethyl)ethylenediamine and 4.8 g of L-lysine in 69 g of water was added to the reaction mixture solution, and the reaction mixture solution was stirred vigorously for 30 minutes. Then 600 g of water was added to disperse the mixture, and the mixture was distilled subsequently to separate acetone, which was followed by the addition of 6 g emulsifier Emulsifier FD® to yield an aqueous polyurethane-urea dispersion, which has a solid content of 52.7 wt % and an average particle size of 244 nm in the dispersed phase (the average particle size was determined by dynamic light scattering, Malvern Zetasizer Nano ZS). The aqueous polyurethane-urea dispersion has a pH value of 6.5, an amount of lateral carboxyl of 2.4 mmol/100 g, an amount of sulfonate group of 3.8 mmol/100 g, based on the polyurethane-urea solid components.

Example 5

520 g of Polyester III and 55 g of Polyester II were dehydrated for 1 hour at 110° C. and 15 mbar, then 2.9 g of 1,4-butanediol was added, and the mixture was cooled while stirring. 49 g of Desmodur®H was added at 60° C., followed by the addition of 33 g of Desmodur®I. The mixture was stirred at 80 to 90° C. until it reaches the isocyanate content of 1.4%. The reaction mixture was dissolved in 910 g of acetone and was cooled to 50° C. A solution of 23.9 g of the sodium salt of N-(2-aminoethyl)-2-aminoethanesulfonic acid and 5.2 g of L-lysine in 75 g of water was added to the reaction mixture solution, and the reaction mixture solution was stirred vigorously for 30 minutes. Then 580 g of water was added to disperse the mixture, to yield an aqueous polyurethane-urea dispersion, which has a solid content of 51 wt % and an average particle size of 340 nm in the dispersed phase (the average particle size was determined by dynamic light scattering, Malvern Zetasizer Nano ZS). The aqueous polyurethane-urea dispersion has a pH value of 7.0, an amount of lateral carboxyl of 2.6 mmol/100 g, an amount of sulfonate group of 8.5 mmol/100 g, based on the polyurethane-urea solid components.

Example 6

720 g of Polyester I and 68 g of Polyester II were dehydrated for 1 hour at 110° C. and 15 mbar, then 3.6 g of 1,4-butanediol was added, and the mixture was cooled while stirring. 61 g of Desmodur®H was added at 60° C., followed by the addition of 40 g of Desmodur. The mixture was stirred at 80 to 90° C. until it reaches the isocyanate content of 1.3%. The reaction mixture was dissolved in 1230 g of acetone and was cooled to 50° C. A solution of 18 g of the sodium salt of N-(2-aminoethyl)-2-aminoethanesulfonic acid, 1.3 g of 6-aminocaproic acid and 6.3 g of L-lysine in 92 g of water was added to the reaction mixture solution, and the reaction mixture solution was stirred vigorously for 30 minutes. Then 800 g of water was added to disperse the mixture to yield an aqueous polyurethane-urea dispersion, which has a solid content of 49.3 wt % and an average particle size of 205 nm in the dispersed phase (the average particle size was determined by dynamic light scattering, Malvern Zetasizer Nano ZS). The aqueous polyurethane-urea dispersion has a pH value of 6.5, an amount of lateral carboxyl of 3.5 mmol/100 g, an amount of sulfonate group of 4.8 mmol/100 g, based on the polyurethane-urea solid components.

Comparative Example 1a (Isophorone Diamine in Place of L-Lysine)

540 g of Polyester I and 51 g of Polyester II were dehydrated for 1 hour at 110° C. and 15 mbar, then 2.7 g of 1,4-butanediol was added, and the mixture was cooled while stirring. 45.4 g of Desmodur®H was added at 60° C., followed by the addition of 30 g of Desmodur®I. The mixture was stirred at 80 to 90° C. until it reaches the isocyanate content of 1.3%. The reaction mixture was dissolved in 930 g of acetone and was cooled to 50° C. A solution of 13.6 g of the sodium salt of N-(2-aminoethyl)-2-aminoethanesulfonic acid, 0.8 g of diethanolamine and 2.77 g of isophorone diamine in 71 g of water was added to the reaction mixture solution, and the reaction mixture solution was stirred vigorously for 30 minutes. Then 600 g of water was added to disperse the mixture, and the mixture was distilled subsequently to separate acetone, which was followed by the addition of 6 g emulsifier Emulsifier FD® to yield an aqueous polyurethane-urea dispersion, which has a solid content of 50 wt % and an average particle size of 216 nm in the dispersed phase (the average particle size was determined by dynamic light scattering, Malvern Zetasizer Nano ZS). The aqueous polyurethane-urea dispersion has a pH value of 6.7, no lateral carboxyl, an amount of sulfonate group of 4.8 mmol/100 g, based on the polyurethane-urea solid components.

Comparative Example 1b (Ethylenediamine in Place of L-Lysine)

540 g of Polyester I and 51 g of Polyester II were dehydrated for 1 hour at 110° C. and 15 mbar, then 2.7 g of 1,4-butanediol was added, and the mixture was cooled while stirring. 45.4 g of Desmodur®H was added at 60° C., followed by the addition of 30 g of Desmodur®I. The mixture was stirred at 80 to 90° C. until it reaches the isocyanate content of 1.3%. The reaction mixture was dissolved in 930 g of acetone and was cooled to 50° C. A solution of 13.6 g of the sodium salt of N-(2-aminoethyl)-2-aminoethanesulfonic acid, 0.8 g of diethanolamine and 1 g of ethylenediamine in 71 g of water was added to the reaction mixture solution, and the reaction mixture solution was stirred vigorously for 30 minutes. Then 600 g of water was added to disperse the mixture, and the mixture was distilled subsequently to separate acetone, which was followed by the addition of 6 g emulsifier Emulsifier FD® to yield an aqueous polyurethane-urea dispersion, which has a solid content of 50 wt % and an average particle size of 208 nm in the dispersed phase (the average particle size was determined by dynamic light scattering, Malvern Zetasizer Nano ZS). The aqueous polyurethane-urea dispersion has a pH value of 6.8, no lateral carboxyl, an amount of sulfonate group of 4.8 mmol/100 g, based on the polyurethane-urea solid components.

Comparative Example 1c (Lateral Carboxyl was Introduced into Aqueous Polyurethane-Urea Dispersion Via Dimethylol Propionic Acid)

720 g of Polyester I and 68 g of Polyester II were dehydrated for 1 hour at 110° C. and 15 mbar, then 14.4 g of dimethylol propionic acid was added, and the mixture was cooled while stirring. 70.8 g of Desmodur®I was added at 60° C., followed by the addition of 47 g of Desmodur®I. The mixture was stirred at 80 to 90° C. until it reaches the isocyanate content of 1.5%. The reaction mixture was dissolved in 1270 g of acetone and was cooled to 50° C. 8.67 g of triethylamine was added to the reaction mixture and the reaction mixture was stirred for 15 minutes. A solution of 1.1 g of diethanolamine and 8.5 g of N-(2-hydroxyethyl)ethylenediamine isophorone diamine in 95 g of water was added to the reaction mixture solution, and the reaction mixture solution was stirred vigorously for 30 minutes. Then 1099 g of water was added to disperse the mixture to yield an aqueous polyurethane-urea dispersion, which has a solid content of 44 wt % and an average particle size of 137 nm in the dispersed phase (the average particle size was determined by dynamic light scattering, Malvern Zetasizer Nano ZS). The aqueous polyurethane-urea dispersion has a pH value of 7.4, an amount of lateral carboxyl of 2.3, an amount of carboxylate group of 9.2 mmol/100 g, based on the polyurethane-urea solid components.

Comparative Example 1d (Lateral Carboxyl was Introduced into Aqueous Polyurethane-Urea Dispersion Via Dimethylol Butanoic Acid)

720 g of Polyester I and 68 g of Polyester II were dehydrated for 1 hour at 110° C. and 15 mbar, then 1.7 g of 1,4-butanediol and 3.2 g of dimethylol butanoic acid were added, and the mixture was cooled while stirring. 61 g of Desmodur®H was added at 60° C., followed by the addition of 40 g of Desmodur®I. The mixture was stirred at 80 to 90° C. until it reaches the isocyanate content of 1.3%. The reaction mixture was dissolved in 1230 g of acetone and was cooled to 50° C. 8.67 g of triethylamine was added to the reaction mixture and the reaction mixture was stirred for 15 minutes. A solution of 18 g of the sodium salt of N-(2-aminoethyl)-2-aminoethanesulfonic acid, 1.1 g of diethanolamine and 2.3 g of N-(2-hydroxyethyl)ethylenediamine isophorone diamine in 95 g water was added to the reaction mixture solution, and the reaction mixture solution was stirred vigorously for 30 minutes. Then 800 g of water was added to disperse the mixture to yield an aqueous polyurethane-urea dispersion, which has a solid content of 49 wt % and an average particle size of 205 nm in the dispersed phase (the average particle size was determined by dynamic light scattering, Malvern Zetasizer Nano ZS). The aqueous polyurethane-urea dispersion has a pH value of 6.5, an amount of lateral carboxyl of 2.4, an amount of sulfonate group of 4.8 mmol/100 g, based on the polyurethane-urea solid components.

Comparative Example 2 (Aqueous Polyurethane-Urea Dispersion Contained Terminal Carboxyl Group but No Lateral Carboxyl Group)

765 g of Polyester I and 72 g of Polyester II were dehydrated for 1 hour at 110° C. and 15 mbar, then 3.8 g of 1,4-butanediol was added, and the mixture was cooled while stirring. 64 g of Desmodur®H was added at 60° C., followed by the addition of 43 g of Desmodur®I. The mixture was stirred at 80 to 90° C. until it reaches the isocyanate content of 1.3%. The reaction mixture was dissolved in 1310 g of acetone and was cooled to 50° C. A solution of 21.2 g of the sodium salt of N-(2-aminoethyl)-2-aminoethanesulfonic acid, 4.1 g of N-(2-hydroxyethyl)ethylenediamine and 3 g of 6-aminocaproic acid in 101 g water was added to the reaction mixture solution, and the reaction mixture solution was stirred vigorously for 30 minutes. Then 850 g of water was added to disperse the mixture to yield an aqueous polyurethane-urea dispersion, which has a solid content of 50.3 wt % and an average particle size of 472 nm in the dispersed phase (the average particle size was determined by dynamic light scattering, Malvern Zetasizer Nano ZS). The aqueous polyurethane-urea dispersion has a pH value of 6.9, an amount of lateral carboxyl of 2.4 mmol/100 g, an amount of sulfonate group of 5.3 mmol/100 g, based on the polyurethane-urea solid components.

Comparative Example 3 (Reducing the Used Amount of the Sodium Salt of N-(2-aminoethyl)-2-aminoethanesulfonic Acid)

540 g of Polyester I and 51 g of Polyester II were dehydrated for 1 hour at 110° C. and 15 mbar, then 2.7 g of 1,4-butanediol was added, and the mixture was cooled while stirring. 45.4 g of Desmodur®H was added at 60° C., followed by the addition of 30 g of Desmodur® I. The mixture was stirred at 80 to 90° C. until it reaches the isocyanate content of 1.3%. The reaction mixture was dissolved in 930 g of acetone and was cooled to 50° C. A solution of 12.2 g of the sodium salt of N-(2-aminoethyl)-2-aminoethanesulfonic acid, 0.8 g of diethanolamine and 1.2 g of ethylenediamine in 71 g of water was added to the reaction mixture solution, and the reaction mixture solution was stirred vigorously for 30 minutes. Then 600 g of water was added to disperse the mixture, and the mixture was distilled subsequently to separate acetone, which was followed by the addition of 6 g emulsifier Emulsifier FD® to yield an aqueous polyurethane-urea dispersion, which has a solid content of 53 wt % and an average particle size of 276 nm in the dispersed phase (the average particle size was determined by dynamic light scattering, Malvern Zetasizer Nano ZS). The aqueous polyurethane-urea dispersion has a pH value of 6.6, no lateral carboxyl, an amount of sulfonate group of 4.3 mmol/100 g, based on the polyurethane-urea solid components.

Comparative Example 4 (Reducing the Used Amount of the Sodium Salt of N-(2-aminoethyl)-2-aminoethanesulfonic Acid)

540 g of Polyester I and 51 g of Polyester II were dehydrated for 1 hour at 110° C. and 15 mbar, then 2.7 g of 1,4-butanediol was added, and the mixture was cooled while stirring. 45.4 g of Desmodur®H was added at 60° C., followed by the addition of 30 g of Desmodur®I. The mixture was stirred at 80 to 90° C. until it reaches the isocyanate content of 1.3%. The reaction mixture was dissolved in 930 g of acetone and was cooled to 50° C. A solution of 10.9 g of the sodium salt of N-(2-aminoethyl)-2-aminoethanesulfonic acid, 0.8 g of diethanolamine and 1.4 g of ethylenediamine in 71 g of water was added to the reaction mixture solution, and the reaction mixture solution was stirred vigorously for 30 minutes. Then 600 g of water was added to disperse the mixture. The experiment failed, resulting in gelation and cannot yield a dispersion. It has no lateral carboxyl, and has an amount of sulfonate group of 3.8 mmol/100 g, based on the polyurethane-urea solid components.

Comparative Example 5 (Diethanolamine was not Used During the Preparation of Polyurethane)

520 g of Polyester III and 55 g of Polyester II were dehydrated for 1 hour at 110° C. and 15 mbar, then 2.9 g of 1,4-butanediol was added, and the mixture was cooled while stirring. 49 g of Desmodur®H was added at 60° C., followed by the addition of 33 g of Desmodur®I. The mixture was stirred at 80 to 90° C. until it reaches the isocyanate content of 1.4%. The reaction mixture was dissolved in 910 g of acetone and was cooled to 50° C. A solution of 23.9 g of the sodium salt of N-(2-aminoethyl)-2-aminoethanesulfonic acid and 1.1 g of ethylenediamine in 75 g of water was added to the reaction mixture solution, and the reaction mixture solution was stirred vigorously for 30 minutes. Then 580 g of water was added to disperse the mixture, to yield an aqueous polyurethane-urea dispersion, which has a solid content of 51.2 wt % and an average particle size of 386 nm in the dispersed phase (the average particle size was determined by dynamic light scattering, Malvern Zetasizer Nano ZS). The aqueous polyurethane-urea dispersion has a pH value of 7.0, no lateral carboxyl, an amount of sulfonate group of 8.5 mmol/100 g, based on the polyurethane-urea solid components.

Comparative Example 6 (Increasing the Contents of Sulfonate Group and Lateral Carboxyl Contained in the Aqueous Polyurethane-Urea Dispersion)

630 g of Polyester I and 60 g of Polyester II were dehydrated for 1 hour at 110° C. and 15 mbar, then 3.2 g of 1,4-butanediol was added, and the mixture was cooled while stirring. 106 g of Desmodur®H was added at 60° C., followed by the addition of 70 g of Desmodur®I. The mixture was stirred at 80 to 90° C. until it reaches the isocyanate content of 1.3%. The reaction mixture was dissolved in 1200 g of acetone and was cooled to 50° C. A solution of 85.2 g of the sodium salt of N-(2-aminoethyl)-2-aminoethanesulfonic acid and 40.7 g of L-lysine in 49 g of water was added to the reaction mixture solution, and the reaction mixture solution was stirred vigorously for 30 minutes. Then 1200 g of water was added to disperse the mixture, and the mixture was distilled subsequently to separate acetone, which was followed by the addition of 10 g emulsifier Emulsifier ED® to yield an aqueous polyurethane-urea dispersion, which has a solid content of 41.2 wt % and an average particle size of 147 nm in the dispersed phase (the average particle size was determined by dynamic light scattering, Malvern Zetasizer Nano ZS). The aqueous polyurethane-urea dispersion has a pH value of 6.5, an amount of lateral carboxyl of 15 mmol/100 g, an amount of sulfonate group of 22 mmol/100 g, based on the polyurethane-urea solid components.

Comparative Example 7 (Increasing the Content of Sulfonate Group Contained in the Aqueous Polyurethane-Urea Dispersion)

698 g of Polyester I and 66 g of Polyester II were dehydrated for 1 hour at 110° C. and 15 mbar, then 3.5 g of 1,4-butanediol was added, and the mixture was cooled while stirring. 89 g of Desmodur®H was added at 60° C., followed by the addition of 59 g of Desmodur®I. The mixture was stirred at 80 to 90° C. until it reaches the isocyanate content of 1.3%. The reaction mixture was dissolved in 1260 g of acetone and was cooled to 50° C. A solution of 88 g of the sodium salt of N-(2-aminoethyl)-2-aminoethanesulfonic acid and 6.7 g of L-lysine in 74.2 g of water was added to the reaction mixture solution, and the reaction mixture solution was stirred vigorously for 30 minutes. Then 1320 g of water was added to disperse the mixture, and the mixture was distilled subsequently to separate acetone, which was followed by the addition of 11 g emulsifier Emulsifier to yield an aqueous polyurethane-urea dispersion, which has a solid content of 39.5 wt % and an average particle size of 169 nm in the dispersed phase (the average particle size was determined by dynamic light scattering, Malvern Zetasizer Nano ZS). The aqueous polyurethane-urea dispersion has a pH value of 6.3, an amount of lateral carboxyl of 2.4 mmol/100 g, an amount of sulfonate group of 22 mmol/100 g, based on the polyurethane-urea solid components.

Comparative Example 8 (Increasing the Content of Lateral Carboxyl Contained in the Aqueous Polyurethane-Urea Dispersion)

585 g of Polyester I and 55 g of Polyester II were dehydrated for 1 hour at 110° C. and 15 mbar, then 2.9 g of 1,4-butanediol was added, and the mixture was cooled while stirring. 66 g of Desmodur®H was added at 60° C., followed by the addition of 43 g of Desmodur®I. The mixture was stirred at 80 to 90° C. until it reaches the isocyanate content of 1.3%. The reaction mixture was dissolved in 1040 g of acetone and was cooled to 50° C. A solution of 13.9 g of the sodium salt of N-(2-aminoethyl)-2-aminoethanesulfonic acid and 34 g of L-lysine in 48 g of water was added to the reaction mixture solution, and the reaction mixture solution was stirred vigorously for 30 minutes. Then 650 g of water was added to disperse the mixture, and the mixture was distilled subsequently to separate acetone, which was followed by the addition of 7 g emulsifier Emulsifier FD® to yield an aqueous polyurethane-urea dispersion, which has a solid content of 50.9 wt % and an average particle size of 229 nm in the dispersed phase (the average particle size was determined by dynamic light scattering, Malvern Zetasizer Nano ZS). The aqueous polyurethane-urea dispersion has a pH value of 6.4, an amount of lateral carboxyl of 15 mmol/100 g, an amount of sulfonate group of 4.3 mmol/100 g, based on the polyurethane-urea solid components.

Determination of the Applied Technology Properties:
Preparation of the Adhesive Dispersion:
placing 100 parts by weight of dispersion in advance and adding aqueous carbodiimide dispersion while stirring.

The determination of the peeling strength (adhesion strength) is carried out with the following composite combined materials:
composite materials: substrate 1: black rubber; substrate 2: black rubber Preparation of the test and the conduction of the test:
Black rubber composite materials:

Black rubber with a width of 20 mm is subjected to mechanical polishing and a rubber treating agent is applied thereon (e.g., dissolving B powder in ethyl acetate). Glue is applied to it after it is dried, and then it is jointed for 10 seconds at a pressure of 4 bar after the activation at 60° C. After the preparation is finished, the sample is stored at room temperature (23±2° C., 50±5% RH) for 1 day. When the test is carried out, 1 kg weight is loaded and the temperature is kept constant at 80° C. for 1 hour. The pulled-apart distance after keeping the sample at 80° C. for 1 hour is recorded. If the sample cannot sustain for 1 hour before glue failure and complete separation, the time for glue failure and complete separation of the sample, which is less than 1 hour, will be recorded.

The pulled-apart distance is the length between the separated jointed parts of the sample measured by a scale. Glue failure and complete separation refers to the complete separation of the jointed parts of the sample.

TABLE 1

Comparison of the heat resistances of the compositions

| Examples | —SO$_3^-$ (mmol/100 g) | lateral carboxyl groups (mmol/100 g) | carbodiimide groups/lateral carboxyl groups | pulled-apart distance (mm) |
|---|---|---|---|---|
| 1a | 4.8 | 2.4 | 1 | 1.5 mm |
| 1b | 4.8 | 2.4 | 2 | 2.5 mm |
| 1c | 4.8 | 2.4 | 5 | 4.5 mm |
| 2 | 5.3 | 2.4 | 2 | 1 mm |
| 3 | 4.3 | 2.4 | 1 | 4.5 mm |
| 4 | 3.8 | 2.4 | 1 | 17 mm |
| 5 | 8.5 | 2.6 | 1 | 11 mm |
| 6 | 4.8 | 3.5 | 2 | 1 mm |

If the pulled-apart distance of the black rubber after being kept at 80° C. for 1 hour is smaller, it indicates the heat resistance is better. When the molar ratio of carbodiimide group to lateral carboxyl contained in aqueous polyurethane-urea dispersion is 1, 2 or 5, said composition has good heat resistance. In the case where the amount of the sodium salt of N-(2-aminoethyl)-2-aminoethanesulfonic acid is reduced by 10% or 20% during the synthesis of polyurethane-urea, the composition can still maintain good heat resistance.

TABLE 2

Comparison of the heat resistances of different compositions

| Examples/Comparative Examples | —SO$_3^-$ (mmol/100 g) | —COO$^-$ (mmol/100 g) | lateral carboxyl groups (mmol/100 g) | carbodiimide groups/lateral carboxyl groups | pulled-apart distance (mm) or time for glue failure and complete separation (min) |
|---|---|---|---|---|---|
| Example 1a | 4.8 | | 2.4 | 1 | 1.5 mm |
| Comparative Example 1a | 4.8 | | 0 | 1 | 51.2 min |
| Comparative Example 1b | 4.8 | | 0 | 1 | 55.5 min |
| Example 1b | 4.8 | | 2.4 | 2 | 2.5 mm |
| Comparative Example 1c | | 9.2 | 2.3 | 2 | 14 mm |
| Comparative Example 1d | 4.8 | | 2.4 | 2 | 18 min |
| Example 2 | 5.3 | | 2.4 | 2 | 1 mm |
| Comparative Example 2 | 5.3 | | 0 | 2 | 38 mm |
| Example 3 | 4.3 | | 2.4 | 1 | 4.5 mm |
| Comparative Example 3 | 4.3 | | 0 | 1 | 72.5 mm |
| Example 4 | 3.8 | | 2.4 | 1 | 17 mm |

TABLE 2-continued

Comparison of the heat resistances of different compositions

| Examples/Comparative Examples | —SO$_3^-$ (mmol/100 g) | —COO$^-$ (mmol/100 g) | lateral carboxyl groups (mmol/100 g) | carbodiimide groups/lateral carboxyl groups | pulled-apart distance (mm) or time for glue failure and complete separation (min) |
|---|---|---|---|---|---|
| Comparative Example 4 | 3.8 | 0 | | N/A | N/A |
| Example 5 | 8.5 | 2.6 | | 1 | 11 mm |
| Comparative Example 5 | 8.5 | 0 | | 1 | 47 mm |
| Comparative Example 6 | 22 | 15 | | N/A | N/A |
| Comparative Example 7 | 22 | 2.4 | | 1 | not viscous |
| Comparative Example 8 | 4.3 | 15 | | N/A | N/A |

* N/A gelation, aqueous polyurethane-urea dispersion cannot be formed

If the pulled-apart distance of the black rubber after being kept at 80° C. for 1 hour is smaller, or the time for glue failure and complete separation is longer, it indicates the heat resistance of the composition is better. Therefore, the compositions formed by the aqueous polyurethane-urea dispersion of the present invention have a better heat resistance than the comparative compositions.

It is easily known by those skilled in the art that the present invention is not limited to the aforementioned details, and can be implemented as other specific forms without departing from the spirit or major characteristics of the present invention. Therefore, from any aspect, the examples as described above shall be regarded as exemplary rather than restrictive, and thus the scope of the present invention shall be defined by the claims rather than the above description. Moreover, any change, with the proviso of within the sense and scope of the equivalents of the claims, shall be considered as being included by the present invention.

The invention claimed is:

1. An aqueous polyurethane-urea dispersion, comprising a polyurethane-urea dispersed therein having sulfonate and/or carboxylate groups and lateral carboxyl groups, wherein an amount of said sulfonate and/or carboxylate groups is 3.2 to 10 mmol/100 g; said lateral carboxyl groups are introduced by an aminocarboxylic acid having an amino functionality of greater than 1; an amount of said lateral carboxyl groups is 1.5 to 5 mmol/100 g, based on the polyurethane-urea solid components, wherein said composition further comprises a cross-linking agent containing carboxyl reactive groups selected from carbodiimides compound, wherein the molar ratio between carbodiimide groups of said carbodiimides compound and the lateral carboxyl groups of the aqueous polyurethane-urea dispersion is 2 to 5, and wherein said aminocarboxylic acid has an amino functionality of 2.

2. The aqueous polyurethane-urea dispersion according to claim 1, wherein said polyurethane-urea is prepared by comprising following components:
   A) at least one polyol component having a number-average molecular weight of 400 to 5000 Daltons and a hydroxyl functionality of not less than 1.9;
   B) optionally at least one polyol component having a number-average molecular weight of 62 to 399 Daltons;
   C) at least one diisocyanate or polyisocyanate component;
   D) at least one aminocarboxylic acid having an amino functionality of greater than 1; and
   E) at least one amino compound having sulfonate and/or carboxylate radicals.

3. The aqueous polyurethane-urea dispersion according to claim 1, wherein said aminocarboxylic acid is selected from lysine.

4. The aqueous polyurethane-urea dispersion according to claim 1, wherein said aqueous dispersion has a pH value of 6 to 9.

5. A composition comprising the aqueous polyurethane-urea dispersion according to claim 1.

6. The composition according to claim 5, wherein said composition is a coating, an adhesive or a sealant.

7. An article, comprising a substrate and the composition according to claim 5 applied thereon.

8. The article according to claim 7, wherein said substrate is selected from rubber, plastics, paper, cardboards, timbers, textiles, metals, alloys, fabrics, fibers, artificial leathers, leathers or inorganic materials.

* * * * *